Patented Apr. 20, 1937

2,077,785

UNITED STATES PATENT OFFICE 2,077,785

PROCESS OF REMOVING RUBBER MATERIAL FROM METAL

George B. Watkins, Toledo, Ohio, assignor to Libbey-Owens-Ford Glass Company, Toledo, Ohio, a corporation of Ohio No Drawing. Application May 14, 1934, Serial No. 725,574

1 Claim. (Cl. 87—5)

The present invention relates to a process for removing rubber or rubber compounds from metal.

In the use of equipment in the supplying of abrasive material in various arts, and particularly in the art of producing plate glass, it has been common to line the pumps, pipes, and other metal portions of the abrasive supplying system with rubber to protect them from the action of the moving abrasive.

While the invention is not limited to any particular art, by way of illustration I will refer to the production of plate glass. In producing plate glass, the glass blanks are first ground by an abrasive such as sand suspended in water. Subsequent treatment of the ground glass involves polishing, but I am primarily concerned with the grinding steps. The sand, as stated, is suspended in water, and it is customary to circulate the abrasive solution over suitable grading cones or compartments and by a settling out process separate the same into the desired grades. There are a number of different ways in which the graded abrasive can be supplied to the glass to be ground, but such systems include the use of pumps, pipes, containers, and the like, which, if not adequately protected, will wear out in a very short time.

To protect such portions of the system, it has been found that rubber sheeting or a rubber liner formed in some other way can be applied to the metal parts to protect them, and one way of affixing the rubber liner to the metal is by vulcanization.

As is well known, processes have been developed whereby rubber can be vulcanized to metal with considerable success and the bond between the two materials is very tenacious.

While the life of rubber liners is quite long as compared to what the life of the metal would be unprotected, nevertheless the linings do wear out and it becomes desirable to remove the old liner and to apply new material.

One practice of recovering the metal parts has been to return them to the rubber companies and they have resorted to a burning process to remove the rubber from the metal. It has been my observation that in many cases the pump castings and other metal parts are seriously damaged either by warpage or cracking during this recovery operation.

I have discovered that the rubber can be separated from the metal, no matter how well bonded together, by immersing the entire structure in an oil bath, raising the temperature of the bath to from approximately 250° to 300° F. and treating the same at this temperature for a period of about 36 hours. At the end of this time complete recovery is had. That is, the metal is free of all rubber deposit, the metal being exceptionally clean, and furthermore this treatment does not cause a warpage or cracking of the pump casting or other metal parts.

The recovery is so satisfactory that the metal parts are ready for further covering with the rubber liner because the oil bath treatment at the elevated temperature and for the time suggested not only removes the rubber liner but leaves the metal in an exceptionally clean condition well adapted for relining.

Any desired or preferred form of apparatus can be employed to carry on the oil bath treatment, the present invention being directed to the process of using an oil bath in the removal of rubber from metal. For the sake of economy, old lubricating oil can be used and in fact this is what has been used in the successful carrying out of the invention on a commercial scale. Obviously, however, it is not necessary to use old lubricating oil as any oil having substantially the same characteristics as ordinary lubricating oil can be employed for this purpose.

I claim:

The process of removing rubber from metal which has been bonded thereto by vulcanization, consisting in immersing the rubber and metal in a bath of lubricating oil, and maintaining said bath of oil at a temperature of approximately 250° to 300° F. for a period of about 36 hours.

GEORGE B. WATKINS.